(12) United States Patent
Eguchi

(10) Patent No.: US 9,197,416 B2
(45) Date of Patent: Nov. 24, 2015

(54) VERIFICATION APPARATUS, VERIFICATION PROGRAM, AND VERIFICATION METHOD

(71) Applicant: FUJITSU FRONTECH LIMITED, Inagi-shi, Tokyo (JP)

(72) Inventor: Shinichi Eguchi, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 113 days.

(21) Appl. No.: 13/962,463

(22) Filed: Aug. 8, 2013

(65) Prior Publication Data

US 2013/0326229 A1 Dec. 5, 2013

Related U.S. Application Data

(63) Continuation of application No. PCT/JP2011/056608, filed on Mar. 18, 2011.

(51) Int. Cl.
*G06F 21/32* (2013.01)
*H04L 9/32* (2006.01)

(52) U.S. Cl.
CPC .............. *H04L 9/3231* (2013.01); *G06F 21/32* (2013.01)

(58) Field of Classification Search
CPC ............ G06F 21/32; G07C 9/00071–9/00087; G07C 2009/00095; G07C 9/00158
USPC .......................................... 713/186; 382/115
See application file for complete search history.

(56) References Cited

U.S. PATENT DOCUMENTS 6,496,800 B1 * 12/2002 Kong et al. .................... 704/239
8,677,139 B1 * 3/2014 Kalocsai ....................... 713/186

(Continued)

FOREIGN PATENT DOCUMENTS

EP 2199945 A2 6/2010
JP 11-104112 A 4/1999

(Continued)

OTHER PUBLICATIONS

Salil Prabhakar, Anil K. Jain, Decision-level fusion in fingerprint verification, Pattern Recognition, vol. 35, Issue 4, Apr. 2002, pp. 861-874.*

(Continued)

*Primary Examiner* — Jason K. Gee
*Assistant Examiner* — Zhimei Zhu
(74) *Attorney, Agent, or Firm* — Westerman, Hattori, Daniels & Adrian, LLP

(57) ABSTRACT

In a verification apparatus, a biometric information acquisition unit acquires a plurality of biometric information pieces from an object. A first verification unit calculates, as a verification score, the similarity between the biometric information piece and a verification information piece, and compares the calculated verification score with a first determination value to determine whether the biometric information piece matches the verification information piece. When the verification fails, a second verification unit performs verification on the plurality of biometric information pieces having a predetermined relationship, using the verification information piece and a second determination value which defines a less stringent criterion than the first determination value. The second verification unit compares the verification score with the second determination value, and determines that the match is confirmed when a plurality of biometric information pieces satisfy the criterion defined by the second determination value.

6 Claims, 18 Drawing Sheets

(56) References Cited

U.S. PATENT DOCUMENTS

| | | | |
|---|---|---|---|
| 2003/0091724 A1* | 5/2003 | Mizoguchi | 427/1 |
| 2003/0236661 A1* | 12/2003 | Burges et al. | 704/205 |
| 2004/0165754 A1* | 8/2004 | Tabata | 382/118 |
| 2005/0229007 A1* | 10/2005 | Bolle et al. | 713/186 |
| 2006/0222211 A1* | 10/2006 | Olivo et al. | 382/115 |
| 2007/0150745 A1* | 6/2007 | Peirce et al. | 713/186 |
| 2008/0077687 A1* | 3/2008 | Marvasti | 709/224 |
| 2008/0101658 A1* | 5/2008 | Ahern et al. | 382/115 |
| 2009/0176566 A1* | 7/2009 | Kelly | 463/29 |
| 2009/0189736 A1* | 7/2009 | Hayashi | 340/5.81 |
| 2009/0232361 A1* | 9/2009 | Miller | 382/115 |
| 2010/0049674 A1* | 2/2010 | Zohar et al. | 706/12 |
| 2010/0205667 A1 | 8/2010 | Anderson et al. | |
| 2012/0188056 A1* | 7/2012 | Sahin et al. | 340/5.82 |
| 2013/0212655 A1* | 8/2013 | Hoyos et al. | 726/5 |
| 2013/0274007 A1* | 10/2013 | Hilbert et al. | 463/29 |
| 2014/0365782 A1* | 12/2014 | Beatson et al. | 713/186 |

FOREIGN PATENT DOCUMENTS

| | | |
|---|---|---|
| JP | 2002-222424 A | 8/2002 |
| JP | 2003-208407 A | 7/2003 |
| JP | 2004-054788 A | 2/2004 |
| JP | 2006-042880 A | 2/2006 |
| JP | 2007-052574 A | 3/2007 |
| JP | 2008-040874 A | 2/2008 |
| JP | 2009-080771 A | 4/2009 |
| JP | 2010-039981 A | 2/2010 |

OTHER PUBLICATIONS

Gian Luca Marcialis, Fabio Roli, "Serial Fusion of Fingerprint and Face Matchers", 2007, in book entitled "Multiple Classifier Systems", Lecture Notes in Computer Science, vol. 4472, pp. 151-160.*

International Search Report dated Apr. 26, 2011, issued in corresponding application No. PCT/JP2011/056608.

Extended European Search Report dated Aug. 7, 2014, issued in corresponding European Patent Application No. 11861425.4 (6 pages).

A. Ross et al., "Multimodal Biometrics: An Overview", Proc. of 12th European Signal Processing Conference (EUSIPCO), Vienna, Austria, pp. 1221-1224, Sep. 2004, cited in the Extended European Search Report dated Aug. 7, 2014.

Partial English translation of Japanese Office Action dated Jun. 24, 2014, issued in corresponding Japanese Patent Application No. 2013-505637.

Office Action dated Jun. 24, 2014, issued in Corresponding Japanese Patent Application No. 2013-505637 (3 pages).

* cited by examiner

FIG. 14

310 REGISTRATION TEMPLATE TABLE

| USER ID | FEATURE INFORMATION (1) | FEATURE INFORMATION (2) | ... | FEATURE INFORMATION (M) |
|---|---|---|---|---|
| 0001 | FEATURE 0001-1 | FEATURE 0001-2 | | FEATURE 0001-M |
| 0002 | FEATURE 0002-1 | FEATURE 0002-2 | | FEATURE 0002-M |
| 0003 | FEATURE 0003-1 | FEATURE 0003-2 | | FEATURE 0003-M |
| 0004 | FEATURE 0004-1 | FEATURE 0004-2 | | FEATURE 0004-M |

FIG. 16
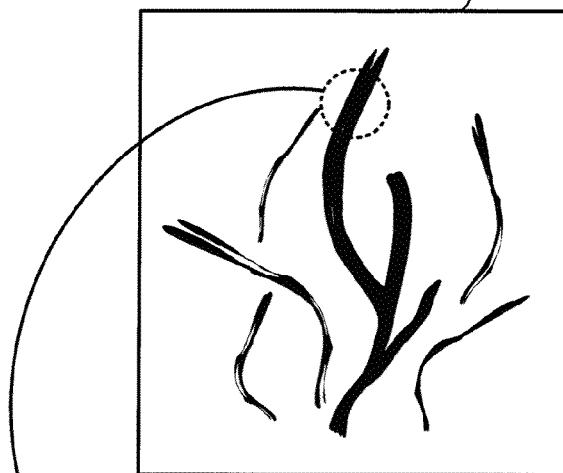
38 SUPERIMPOSED IMAGE
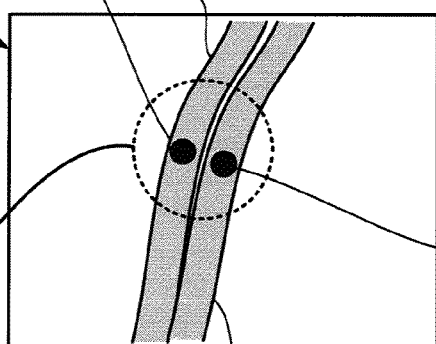
41 FEATURE POINT (VERIFICATION IMAGE)
40 VEIN IMAGE (VERIFICATION IMAGE)
43 FEATURE POINT (TEMPLATE IMAGE)
42 VEIN IMAGE (TEMPLATE IMAGE)
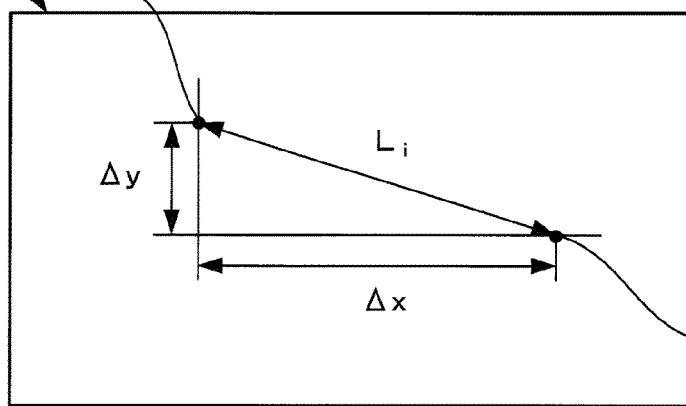
41 FEATURE POINT (VERIFICATION IMAGE)
43 FEATURE POINT (TEMPLATE IMAGE)

300 VERIFICATION RESULTS

| VERIFICATION RESULT NO. | DISTANCE VARIANCE | VARIANCE DETERMINATION RESULT | VERIFICATION SCORE | RELIABILITY | CUMULATIVE RELIABILITY |
|---|---|---|---|---|---|
| 0001 | 4210 | NO | 478 | 85.333% | 85.333% |
| 0002 | 5300 | YES | 422 | — | — |
| 0003 | 1020 | NO | 389 | 26.000% | 89.147% |
| 0004 | 2520 | NO | 412 | 41.333% | 93.633% |
| 0005 | 660 | NO | 452 | 68.000% | 97.662% |
| 0006 | 2220 | NO | 498 | 98.667% | 99.973% |
| 0007 | 4902 | YES | 480 | — | — |
| 0008 | 1153 | NO | 477 | 84.667% | 99.996% |
| 0009 | 1852 | NO | 395 | 70.000% | 99.997% |

FIG. 17

VERIFICATION APPARATUS, VERIFICATION PROGRAM, AND VERIFICATION METHOD

CROSS-REFERENCE TO RELATED APPLICATION

This application is a continuation application of International Application PCT/JP2011/056608 filed on Mar. 18, 2011 which designated the U.S., the entire contents of which are incorporated herein by reference.

FIELD

The present invention relates to a verification apparatus, a verification program, and a verification method.

BACKGROUND

The human body has biometric information that identifies an individual. Some types of biometric information are used for identifying and authenticating an individual. For example, it is known that biometric information that may be used for authentication includes fingerprints, retina, iris, face, blood vessels, deoxyribonucleic acid (DNA), and the like.

With the recent developments in biometric authentication technologies, various types of individual authentication apparatuses have become available. These apparatuses recognize the features of a living body, that is, a part of the human body, so as to authenticate an individual. For example, palm vein authentication technology is used in transactions in bank accounts, door security systems, log-in authentication in personal computers, and the like. In biometric authentication, biometric information acquired upon authentication is verified against biometric information acquired upon registration (registered template).

In order to improve the accuracy of authentication using biometric information, it is preferable to acquire biometric information of a certain level of accuracy each time authentication is performed. However, acquired biometric information is not always the same, and there is a change every time acquisition is performed. Therefore, verification of biometric information involves calculating a verification score that indicates the similarity between a registered template and the acquired biometric information, and comparing the calculated verification score with a determination value. There has been proposed a verification apparatus capable of, even if there is a change in the acquired biometric information, performing verification with high accuracy by correcting a verification score (see, for example, Japanese Laid-open Patent Publication No. 2008-40874).

However, since the amount of features contained in acquired biometric information varies between individuals, and the difficulty of authentication varies from user to user, regardless of the scheme of authentication. Further, for example, the amount of features that may be acquired from the biometric information also varies with the surrounding environment in which the biometric information is acquired, such as temperature, humidity, outside light, the position of the sensor, individual differences between sensors, and the like.

Accordingly, authenticating a specific user (who inherently has only a small amount of feature information, or who is not familiar with authentication) may be more difficult than authenticating other users. Similarly, authenticating a user in a specific environment may be more difficult than in other environments.

One of the issues in authentication technology is to reduce the difficulty in authenticating a user under such specific conditions so as to increase the authentication rate and thus to improve the usability.

SUMMARY

According to an aspect of the embodiments to be discussed herein, there is provided a verification apparatus that includes a memory configured to store a plurality of biometric information pieces acquired from a living body; and one or more processors configured to perform a procedure including: performing first verification on one or more of the plurality of biometric information pieces, using a preregistered verification information piece and a first determination value, and performing second verification on the plurality of biometric information pieces having a predetermined relationship, using the verification information piece and a second determination value which defines a less stringent criterion than the first determination value, when the first verification fails.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 illustrates an example of registered template table according to the second embodiment;

FIG. 16 illustrates verification performed by the verification apparatus according to the second embodiment;

FIG. 17 illustrates exemplary verification results obtained by the verification apparatus according to the second embodiment.

DESCRIPTION OF EMBODIMENTS

Embodiments will be explained below with reference to the accompanying drawings.

First Embodiment

Figure 1:
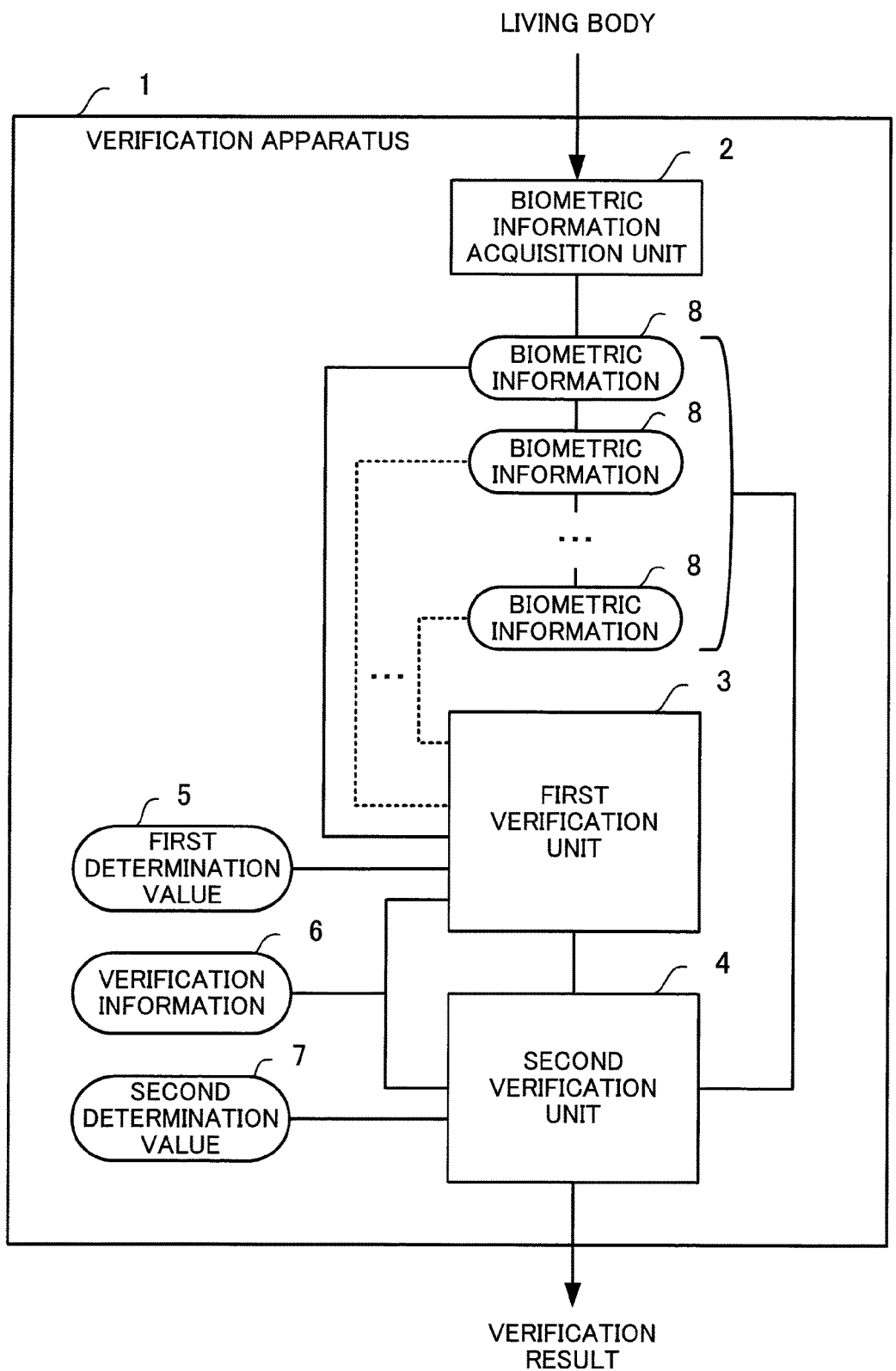
FIG. 1 illustrates the configuration of a verification apparatus according to a first embodiment.

First, a verification apparatus of a first embodiment will be described with reference to FIG. 1. FIG. 1 illustrates the configuration of the verification apparatus according to the first embodiment.

A verification apparatus 1 acquires biometric information from a living body, and verifies the acquired biometric information against preregistered verification information. Biometric information may be acquired from a living body, and be used for identifying an individual.

The verification apparatus 1 includes a biometric information acquisition unit 2, a first verification unit 3, and a second verification unit 4. The biometric information acquisition unit 2 acquires a biometric information piece 8 from a biometric information source part of a living body. The biometric information acquisition unit 2 acquires a plurality of biometric information pieces 8 by performing acquisition a plurality of times. The biometric information acquisition unit 2 acquires the plurality of biometric information pieces 8 from the same object (the same biometric information source part) at different timings.

The first verification unit 3 performs verification on the biometric information piece 8, using a verification information piece 6 and a first determination value 5. The first verification unit 3 calculates, as a verification score (similarity score), the similarity between the biometric information piece 8 and the verification information piece 6. The first verification unit 3 compares the calculated verification score with the first determination value 5 so as to determine whether verification is successful, that is, so as to determine whether the biometric information piece 8 used for verification matches the verification information piece 6. Then, the first verification unit 3 outputs the verification result. The verification information piece 6 is a preregistered biometric information piece, and is stored in a storage unit of the verification apparatus 1 or a storage unit of an external device (such as a computer, an IC card reader and writer, or the like, which is connected for communication). In the case where there are a plurality of biometric information pieces 8 and verification information pieces 6, the first verification unit 3 may perform verification on an arbitrary combination of biometric information piece 8 and verification information piece 6.

In the case where the verification by the first verification unit 3 has failed, the second verification unit 4 performs verification on the plurality of biometric information pieces 8 having a predetermined relationship, using the verification information piece 6 and a second determination value 7 which defines a less stringent criterion than the first determination value 5. The plurality of biometric information pieces 8 on which the second verification unit 4 performs verification are those rejected by the verification performed by the first verification unit 3. These plural biometric information pieces 8 have a predetermined relationship with a reduced risk of false acceptance. For example, these plural biometric information pieces 8 are information pieces that are ensured to have been acquired from the same living body. More specifically, these plural biometric information pieces 8 are information pieces that are acquired from continuously captured images of a living body, or information pieces remaining after statistically irrelevant data are removed.

The second verification unit 4 compares the verification score calculated by the first verification unit 3 with the second determination value 7, and determines that the match is confirmed when a plurality of biometric information pieces 8 satisfy the criterion defined by the second determination value 7. In this way, the second verification unit 4 evaluates a plurality of biometric information pieces 8, and thereby prevents the accuracy from lowering due to the determination criterion for each biometric information piece 8 being less stringent. Thus, the second verification unit 4 achieves the overall target authentication accuracy of the verification apparatus 1.

Accordingly, the verification apparatus 1 may increase the authentication rate of a user whose authentication by the first verification unit 3 is difficult, reduce the number of times that the user retries a verification operation, and improve the usability.

It is to be noted that the verification score is the degree of similarity between the biometric information piece 8 and the verification information piece 6 derived from a predetermined derivation method, and any known method may be used. Further, the first determination value 5 is a threshold that is set on the basis of a target authentication accuracy of the verification apparatus 1, that is, a false rejection rate (FRR) and a false acceptance rate (FAR) that are acceptable. The second determination value 7 is a threshold defining a less stringent criterion than the first determination value 5. When a less stringent determination criterion is used, the determination of whether verification is successful is made using a verification score indicating a degree of similarity less than the first determination value 5. That is, the second determination value 7 is a threshold that indicates a lower false rejection rate than the first determination value 5, and indicates a higher false acceptance rate than the first determination value 5. In other words, the first determination value 5 is a threshold for determining whether the user is a rightful user, and the second determination value 7 is a threshold associated with an increased risk of false acceptance.

It is to be noted that, according to the testing and reporting method defined in ISO/IEC19795:2006, the false rejection rate (FRR) and the false acceptance rate (FAR) in authentication that involves acquiring biometric information n times are represented by the following expressions (1) and (2), respectively. Further, retrying verification usually improves the false rejection rate, but decreases the false acceptance rate.

$$FRR(n) = FRR^n \tag{1}$$

$$FAR(n) = FAR \times n \tag{2}$$

However, it is known from experience that the expressions (1) and (2) do not apply to the false rejection rate (FRR) and false acceptance rate (FAR) of approximately 10% of the users. The events of false rejection and false acceptance with respect to these certain users are not only due to probabilistic events, but also greatly due to other causes such as the acquired biometric information being biased.

Figure 2:
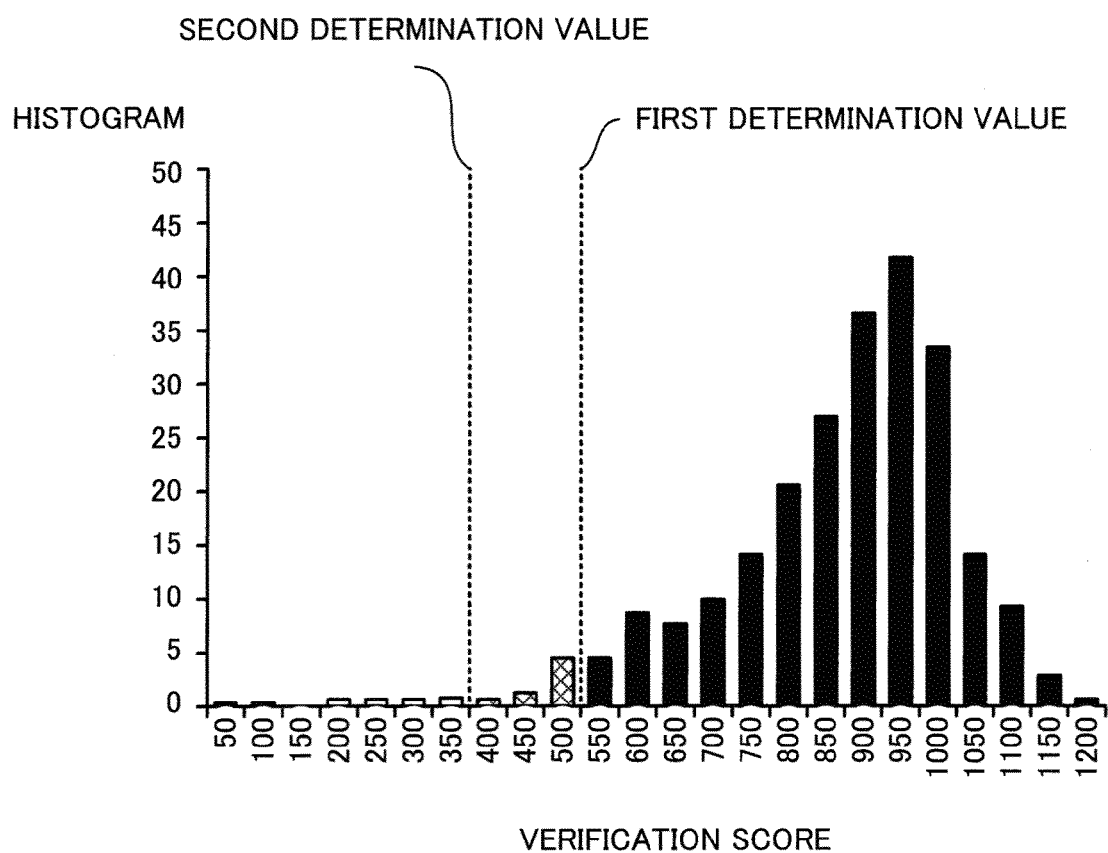
FIG. 2 illustrates an example of distribution of verification scores of ordinary users calculated by the verification apparatus according to the first embodiment.
Figure 3:
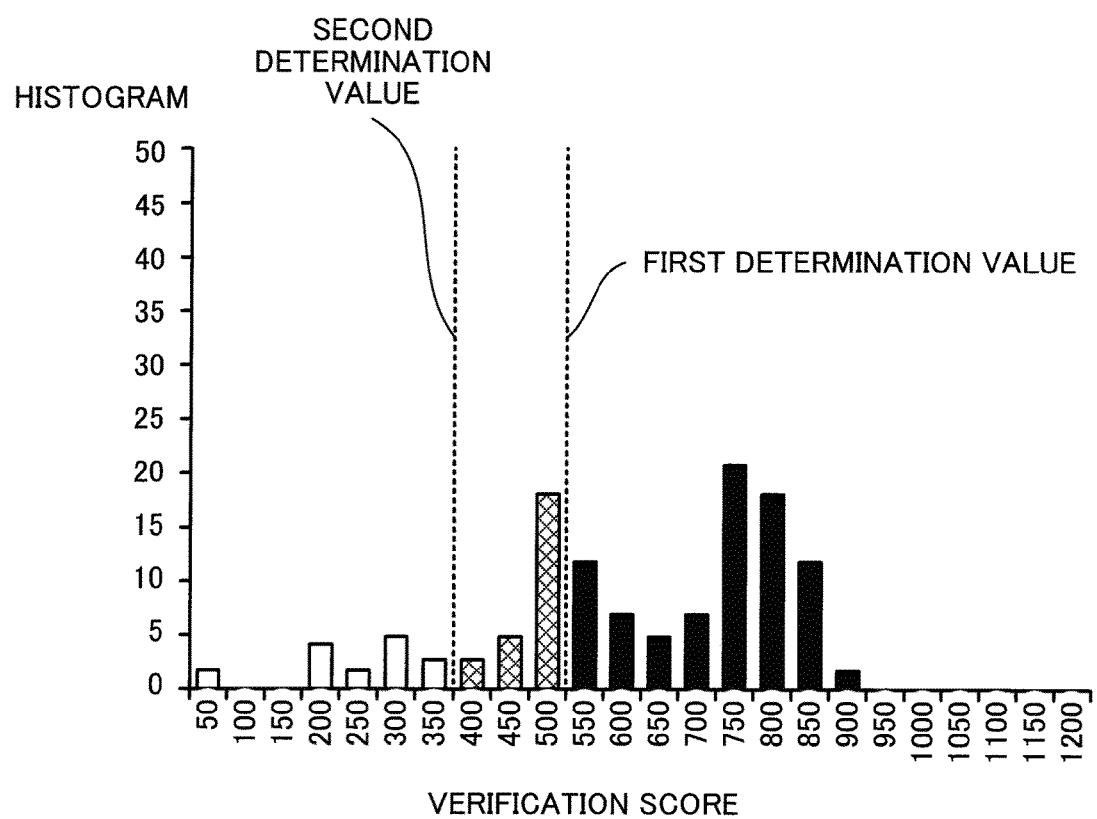
FIG. 3 illustrates an example of distribution of verification scores of certain users calculated by the verification apparatus according to the first embodiment.

Examples of distribution of verification scores are illustrated in FIGS. 2 and 3. FIG. 2 illustrates an example of distribution of verification scores of ordinary users calculated by the verification apparatus according to the first embodiment. FIG. 3 illustrates an example of distribution of verification scores of certain users calculated by the verification apparatus according to the first embodiment. For example, the verification scores of the ordinary users are distributed as illustrated in FIG. 2, and a greater number of users pass the verification using the first determination value.

On the other hand, the verification scores of the certain users are distributed as illustrated in FIG. 3, and a relatively large number of users are rejected by the verification using the first determination value. These certain users have a certain number of verification scores that are distributed between the first determination value and the second determination value. Therefore, in the case where such a user has a plurality of scores in this range, even if the user passes the verification on the basis of a certain reliability level, it is possible to achieve the target authentication accuracy of the verification apparatus 1.

Accordingly, as for the users who are rightful but are rejected by the verification, the verification apparatus 1 may allow a part (for example, 50%) of these users to pass the verification by the second verification unit 4.

Second Embodiment

Figure 4:
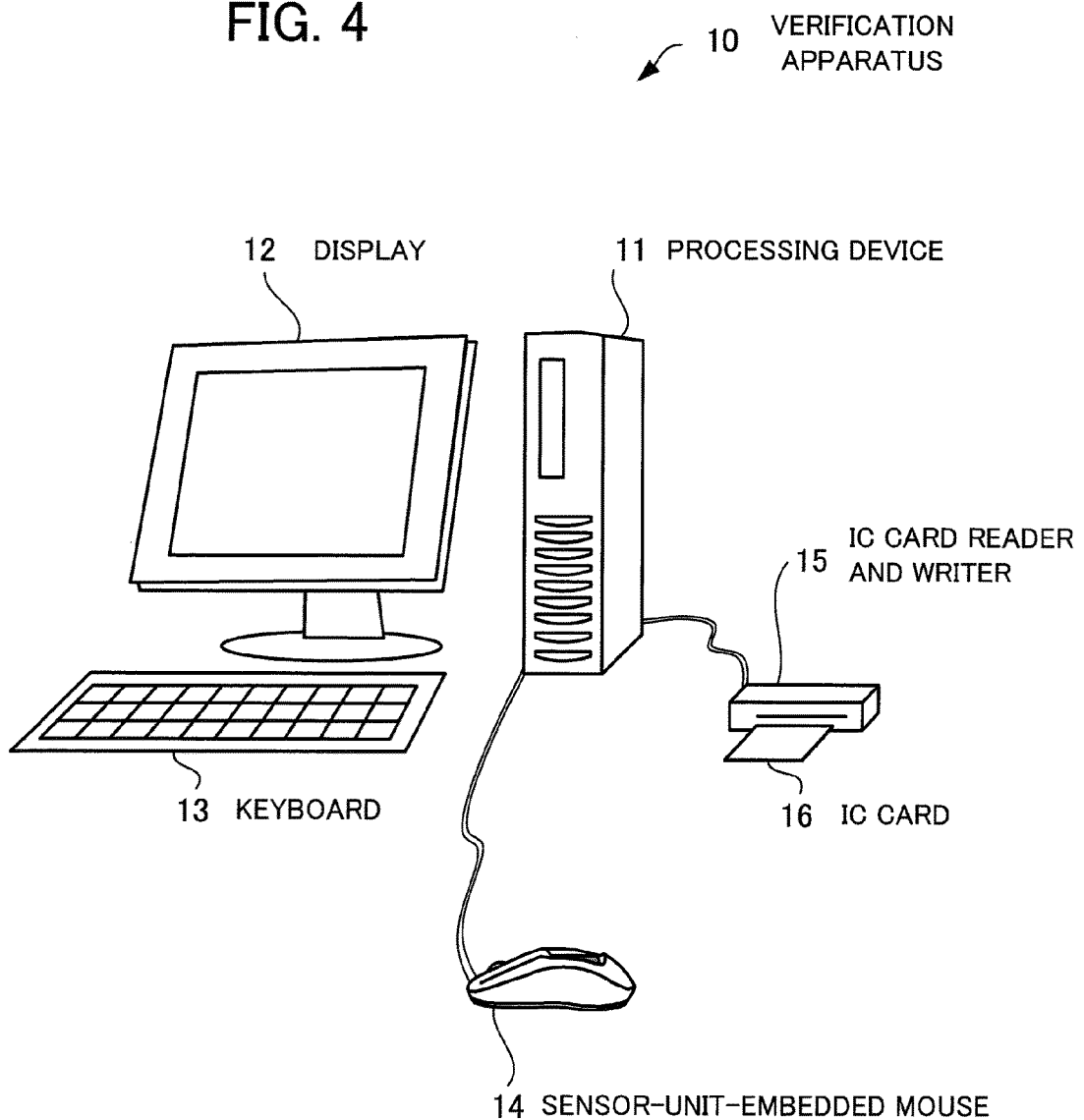
FIG. 4 illustrates the overview of a verification apparatus according to a second embodiment.

Next, a more specific example of verification apparatus will be described as a second embodiment. First, an overview of the verification apparatus will be described with reference to FIG. 4. FIG. 4 illustrates the overview of the verification apparatus according to the second embodiment. Although a verification apparatus 10 that performs verification on the basis of palm veins is illustrated as the verification apparatus of the second embodiment, the present invention is not limited thereto. The verification apparatus may be implemented as an apparatus that performs verification on the basis of the features detected from other parts of a living body.

When authenticating a user, the verification apparatus 10 performs verification by comparing preregistered biometric information (registered template) and biometric information acquired by the verification apparatus 10. The verification apparatus 10 is used when logging on to an information system or the like.

The verification apparatus 10 includes a processing device 11, a display 12, and a sensor-unit-embedded mouse 14. The verification apparatus 10 may further include a keyboard 13, an integrated circuit (IC) card reader and writer 15, and the like, as needed. The sensor-unit-embedded mouse 14 serves as a mouse for receiving input operations, and includes a sensor unit that captures a palm vein image. The sensor unit includes an imaging device so as to capture a palm vein image of the user, and output the image to the processing device 11. The IC card reader and writer 15 reads information from and writes information into an IC card 16 of the user. The keyboard 13 and the sensor-unit-embedded mouse 14 receive input operations.

The following describes a verification operation for palm vein authentication performed by the verification apparatus 10. The user who requests authentication enters identification information for identifying the user (for example, a user ID) using the keyboard 13, the sensor-unit-embedded mouse 14, or the IC card reader and writer 15. The verification apparatus 10 presents the user with an authentication procedure on the display 12, and prompts the user to input biometric information for verification. The user inputs biometric information by placing the hand over the sensor-unit-embedded mouse 14. Then, the verification apparatus 10 having received a palm vein image as biometric information verifies the input information against a registered template. The registered template may be acquired from a storage unit of the processing device 11, a storage unit of an authentication server connected over a network, or a memory of the IC card 16 of the user.

For example, in the case where the verification apparatus 10 is for personal use, the verification apparatus 10 acquires a registered template from the storage unit of the processing device 11 or a memory of the IC card 16 of the user.

Figure 5:
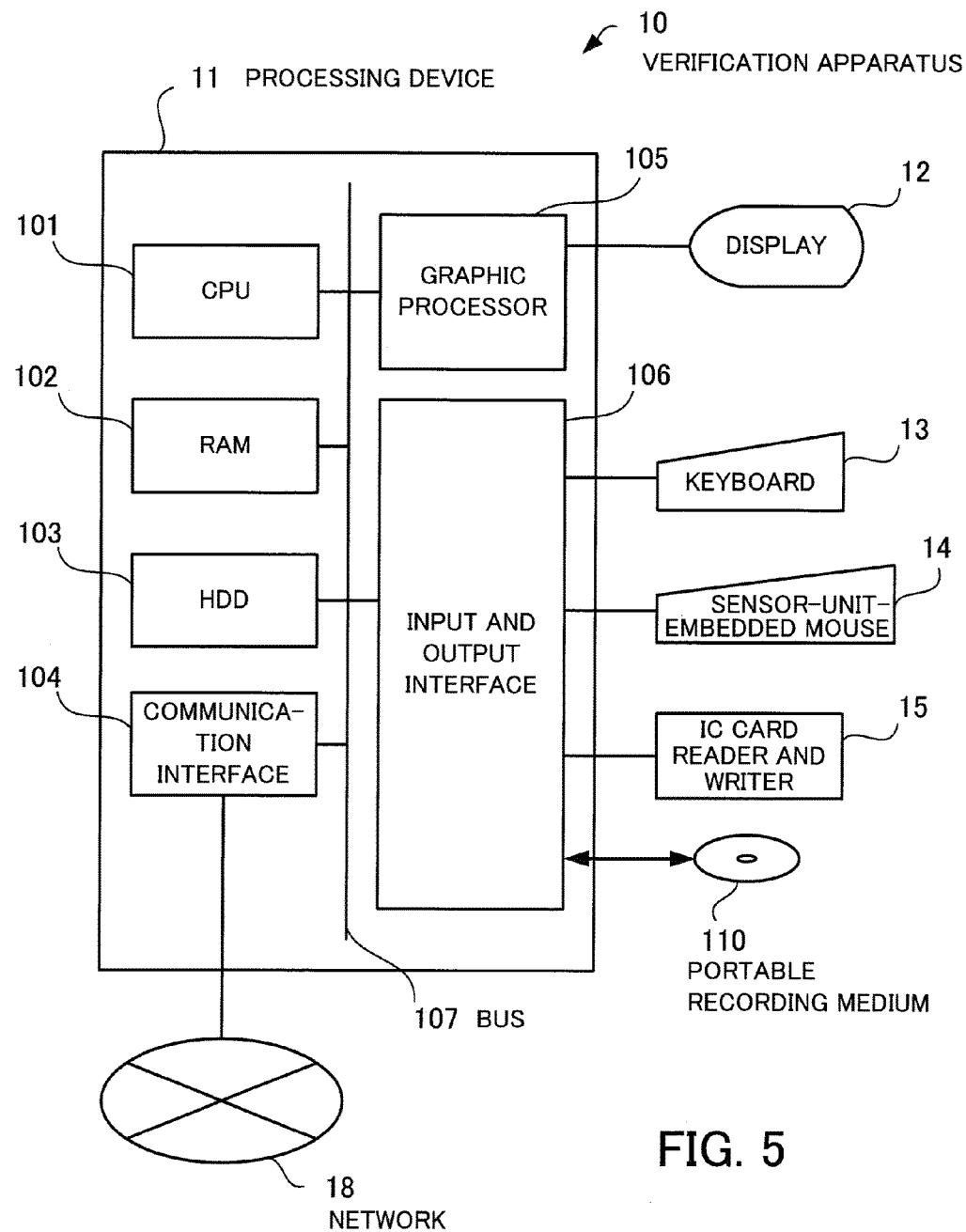
FIG. 5 illustrates the hardware configuration of the verification apparatus according to the second embodiment.

Next, an exemplary hardware configuration of the verification apparatus 10 of this embodiment will be described with reference to FIG. 5. FIG. 5 illustrates the hardware configuration of the verification apparatus according to the second embodiment.

The entire operations of the verification apparatus 10 are controlled by a central processing unit (CPU) 101 of the processing device 11. The CPU 101 is connected to a random access memory (RAM) 102, a hard disk drive (HDD) 103, a communication interface 104, a graphic processor 105, and an input and output interface 106 via a bus 107.

The RAM 102 temporarily stores at least part of the operating system (OS) program and application programs that are executed by the CPU 101. The RAM 102 also stores various types of data that are used for operations of the CPU 101. The HDD 103 stores the OS and application programs.

The graphic processor 105 is connected to the display 12. The graphic processor 105 displays an image on the screen of the display 12 in accordance with an instruction from the CPU 101.

The input and output interface 106 is connected to the keyboard 13, the sensor-unit-embedded mouse 14, and the IC card reader and writer 15. Further, the input and output interface 106 is connectable to a portable recording medium interface that is capable of writing information into a portable recording medium 110 and reading information from the portable recording medium 110. The input and output interface 106 transmits signals, which are transmitted from the keyboard 13, the sensor-unit-embedded mouse 14, the IC card reader and writer 15, and the portable recording medium interface, to the CPU 101 via the bus 107.

The communication interface 104 is connected to a network 18. The communication interface 104 transmits data to and receives data from another computer that is connected over a network.

With the hardware configuration described above, it is possible to realize the processing functions of this embodiment.

The processing device 11 may be formed of modules including a field programmable gate array (FPGA) and a digital signal processor (DSP), respectively, and may be configured without including the CPU 101. In this case, the processing device 11 includes a non-volatile memory (for example, electrically erasable and programmable read only memory (EEPROM), flash memory, flash-memory-based memory card, or the like) and stores firmware of the modules. The firmware may be written in the non-volatile memory via the portable recording medium 110 or the communication interface 104. In this way, the firmware of the processing device 11 may be updated by rewriting the firmware stored in the non-volatile memory.

Figure 6:
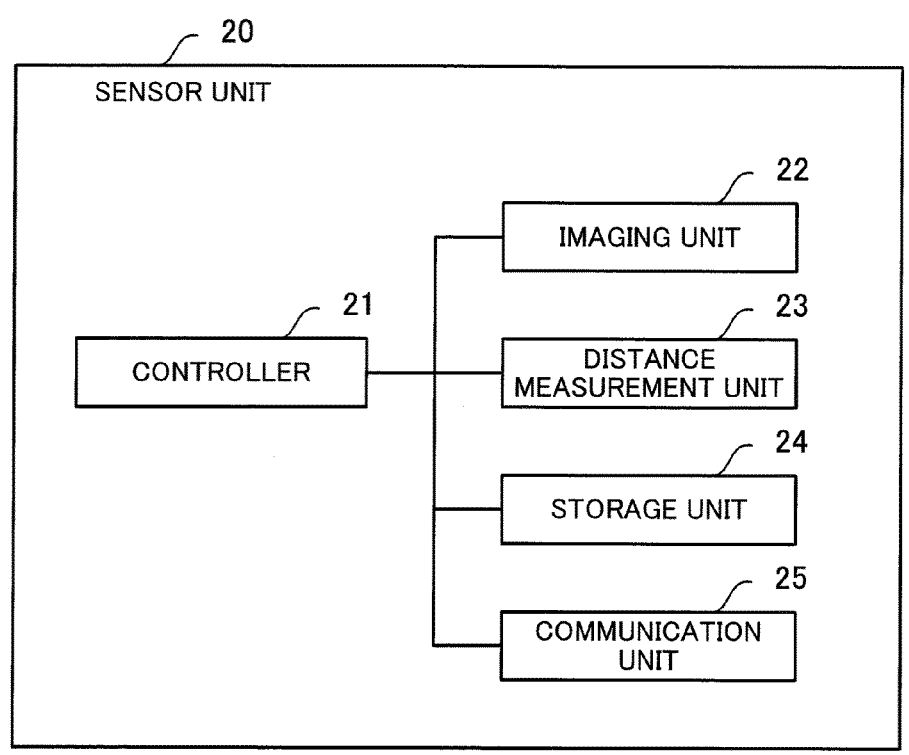
FIG. 6 illustrates the configuration of a sensor unit according to the second embodiment.

Next, the sensor unit embedded in the sensor-unit-embedded mouse 14 will be described with reference to FIG. 6. FIG. 6 illustrates the configuration of the sensor unit according to the second embodiment.

A sensor unit 20 is disposed at a portion of the sensor-unit-embedded mouse 14 which comes into contact with the palm when the mouse is operated. The sensor unit 20 acquires a palm vein image by capturing an image of the palm placed over the sensor-unit-embedded mouse 14 without being in contact therewith.

The sensor unit 20 includes a controller 21, an imaging unit 22, a distance measurement unit 23, a storage unit 24, and a communication unit 25.

The controller 21 performs overall control of the processing units. The imaging unit 22 captures an image of a living body as an imaging object so as to acquire image information. The imaging unit 22 includes an image sensor (for example, complementary metal oxide semiconductor (CMOS) sensor, charge coupled device (CCD) sensor, or the like) that captures an image of the living body, a condenser lens, and a plurality of near-infrared light-emitting diodes (LED) that irradiate the imaging object. The near-infrared light-emitting diodes are disposed around the image sensor, for example, and emit near-infrared rays toward the imaging object (upward) such that the image sensor captures an image of the imaging object irradiated with the near-infrared rays. The imaging unit 22 is capable of continuously capturing images of the imaging object, and takes 15 frames per second, for example. The speed of capturing images may be changed in the settings. With regard to the timing of capturing images, the imaging unit 22 may capture an image in accordance with the distance to the imaging object on the basis of the output from the distance measurement unit 23, regardless of time. It is to be noted that the imaging unit 22 has a configuration suitable for capturing images of palm veins. In the case of capturing images of another part of the living body, such as iris or the like, a configuration suitable for the imaging object may be employed.

The distance measurement unit 23 acquires distance information indicating the distance to the living body as an imaging object. The storage unit 24 stores the image information acquired by the imaging unit 22 and the distance information acquired by the distance measurement unit 23 in association with each other. The communication unit 25 is communicably connected to the processing device so as to receive instructions from the processing device 11 and transmit the image information and the distance information.

The image captured by the sensor unit 20 is an image obtained by irradiating the living body (palm) as an imaging object with near-infrared rays and capturing an image of a reflection light therefrom. The hemoglobin in the red blood cells flowing in the veins does not carry oxygen. Therefore, this hemoglobin (reduced hemoglobin) absorbs near-infrared rays at wavelengths near 700 through 1,000 nanometers. Accordingly, when near-infrared rays are made incident on the palm, reflection is weak only in the areas where veins are present. Thus, the position of the veins may be identified on the basis of the intensity of the reflected near-infrared rays. Using a predetermined light source makes it easy to extract feature information from the captured image, but the captured image becomes an achromatic image.

Figure 7:
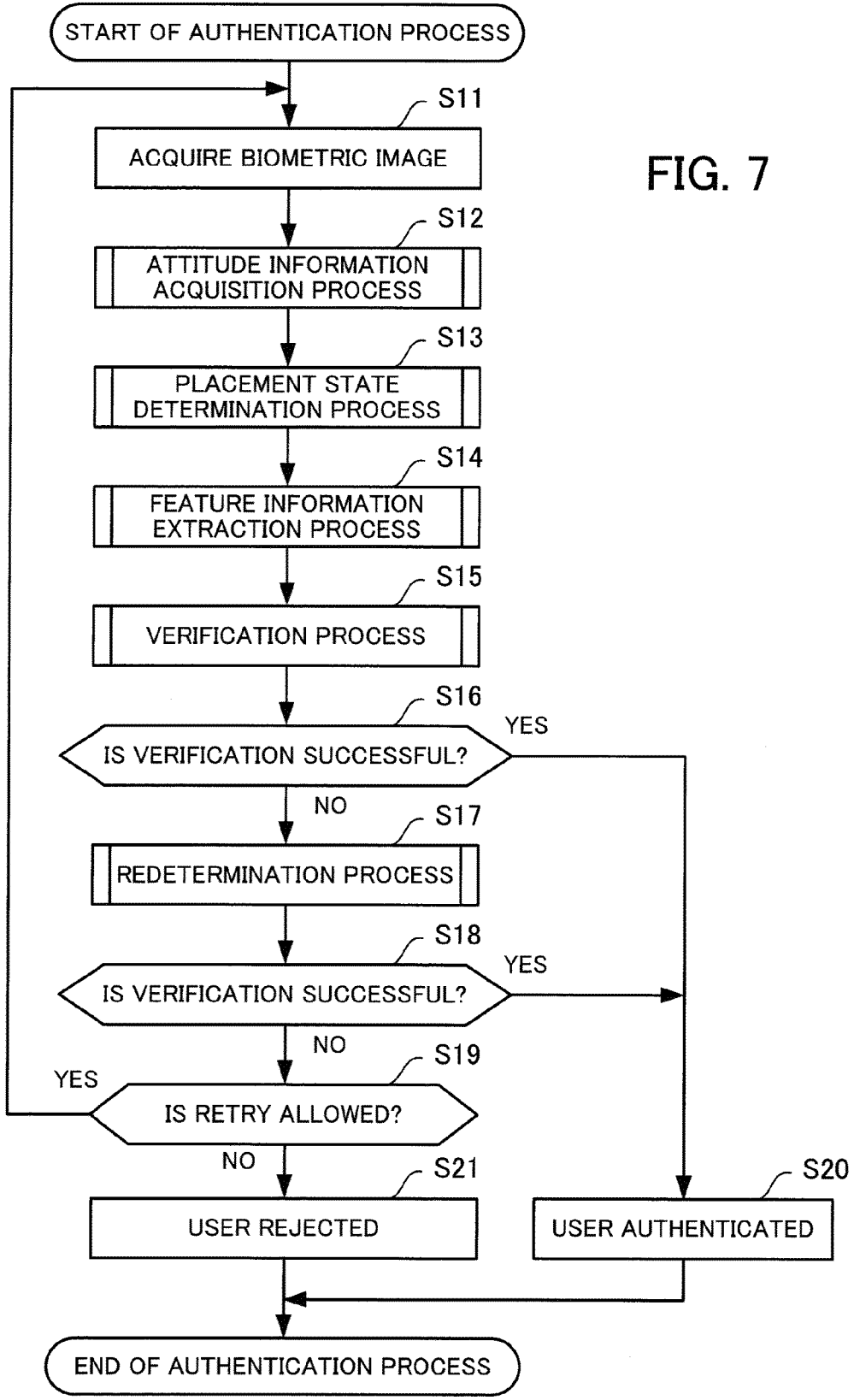
FIG. 7 is a flowchart of an authentication process according to the second embodiment.

Next, an authentication process performed by the processing device 11 will be described with reference to FIG. 7. FIG. 7 is a flowchart of an authentication process according to the second embodiment. The processing device 11 executes an authentication process in response to an authentication request received from the user.

(Step S11) The processing device 11 requests the sensor-unit-embedded mouse 14 for image information pieces (biometric images) of a palm vein image to be used for verification. The sensor-unit-embedded mouse 14 continuously captures images of the living body as an imaging object so as to acquire a plurality of image information pieces. Upon capturing an image of the living body, the sensor-unit-embedded mouse 14 measures the distance to the imaging object, and generates distance information of the imaging object. The sensor-unit-embedded mouse 14 alternately performs distance measurement and image capture. The sensor-unit-embedded mouse 14 outputs, to the processing device 11, the plurality of image information pieces and distance information pieces generated before and after capture of each image information piece. For example, in the case where the sensor-unit-embedded mouse 14 captures 10 biometric images in a predetermined time period (for example, 1 second), the sensor-unit-embedded mouse 14 outputs 10 image information pieces and 11 (=10+1) distance information pieces. The processing device 11 acquires, from the sensor-unit-embedded mouse 14, the plurality of image information pieces and the distance information pieces generated before and after capture of each image information piece.

(Step S12) The processing device 11 performs an attitude information acquisition process for acquiring palm attitude information from the acquired image information piece, and determining whether the attitude of the palm is appropriate for use in verification. The details of the attitude information acquisition process will be described below with reference to FIG. 8.

(Step S13) The processing device 11 performs a placement state determination process for determining based on the acquired image information pieces and distance information whether the acquired image information pieces are acquired from a continuous palm placing motion. The details of the placement state determination process will be described below with reference to FIG. 9.

(Step S14) The processing device 11 performs a feature information extraction process for extracting a feature information piece from the acquired image information piece. The details of the feature information extraction process will be described below with reference to FIGS. 10 through 12.

(Step S15) The processing device 11 performs a verification process for verifying the extracted feature information piece against a registered template. The details of the verification process will be described below with reference to FIGS. 13 through 17.

(Step S16) As a result of the verification process, if the processing device 11 determines that the verification has succeeded (verification: SUCCESS), the process proceeds to step S20. If the verification has failed (verification: FAILURE), the process proceeds to step S17.

(Step S17) The processing device 11 performs a redetermination process for performing redetermination on the image information pieces that are rejected in the verification process. In the redetermination process, although verification is performed using a less stringent determination criterion than that of the verification process, since determination is performed on a plurality of image information pieces, the authentication accuracy is prevented from lowering. The details of the redetermination process will be described below with reference to FIG. 18.

(Step S18) As a result of the redetermination process by the processing device 11, if the verification has succeeded, the process proceeds to step S20. If the verification has failed, the process proceeds to step S19.

(Step S19) The processing device 11 determines whether to retry verification. Determination of whether to perform a retry is made when the attitude of the palm is determined not to be appropriate for use in verification in the attitude information acquisition process; when the image information pieces are determined not to be acquired from a continuous hand placing motion in the placement state determination process; and when verification fails in the redetermination process. It is to be noted that the processing device 11 performs a retry if the number of times of retry is less than a predetermined number of times, and does not perform a retry if the number of times of retry has reached the predetermined number of times. If the processing device 11 determines to retry verification, the process proceeds to step S11. On the other hand, if the processing device 11 determines not to retry verification, the process proceeds to step S21.

(Step S20) In response to the successful verification, the processing device 11 determines that the user is authenticated, and performs an operation that is needed in response to the successful authentication. Then, the authentication process ends.

(Step S21) In response to the failed verification, the processing device 11 determines that the user is rejected, and performs an operation that is needed in response to the failed authentication. Then, the authentication process ends.

In this way, while maintaining a predetermined level of authentication accuracy, the verification apparatus 10 may increase the authentication rate of a user whose authentication by a verification process is difficult, by performing a redetermination process. Thus, the verification apparatus 10 reduces the number of times that the user retries a verification operation, and improves the usability.

It is to be noted that, although the processing device 11 is configured to acquire a plurality of image information pieces of the living body that are continuously captured by the sensor-unit-embedded mouse 14, the processing device 11 may be configured to acquire a plurality of image information pieces that are captured at the same time by a plurality of sensor units. In this case, the verification apparatus 10 may include a plurality of sensor units in place of the sensor-unit-embedded mouse 14. Alternatively, the verification apparatus 10 may be configured such that the sensor unit of the sensor-unit-embedded mouse 14 includes a plurality of imaging devices so as to acquire a plurality of image information pieces at the same time.

In this way, the verification apparatus 10 may easily ensure that the imaging objects of the plurality of image information pieces are identical to each other.

Figure 8:
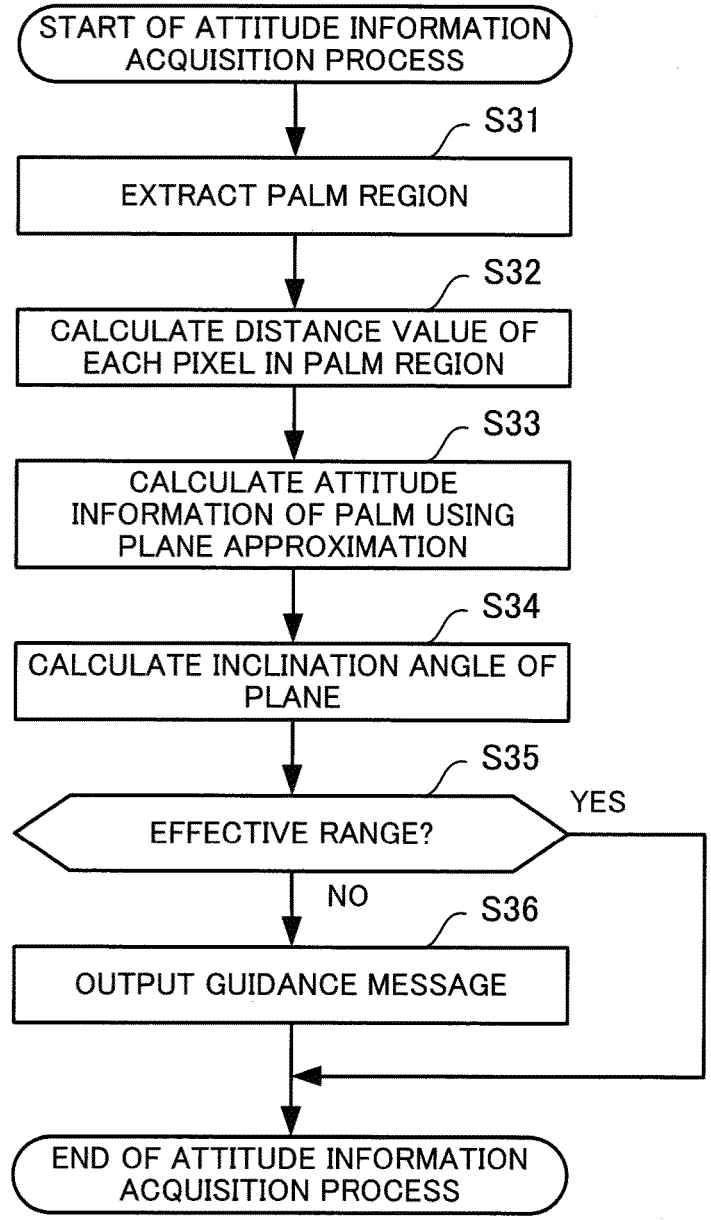
FIG. 8 is a flowchart of an attitude information acquisition process according to the second embodiment.

Next, an attitude information acquisition process performed by the processing device 11 will be described with reference to FIG. 8. FIG. 8 is a flowchart of an attitude information acquisition process according to the second embodiment. The processing device 11 acquires, from the sensor-unit-embedded mouse 14, a plurality of image information pieces and distance information pieces generated before and after capture of each image information piece, and performs an attitude information acquisition process.

(Step S31) The processing device 11 extracts a palm region from each of the acquired image information pieces. For example, extraction of a palm region is performed by binarizing the image information piece and then performing morphology contour extraction. It is to be noted that extraction of a palm region may be performed by any other method than morphology contour extraction.

(Step S32) The processing device 11 calculates a distance value of each pixel in the palm region extracted from each of the acquired image information pieces. For example, the distance value of each pixel in the palm region may be calculated from the luminance value of each pixel in the palm region in the captured image, on the basis of the relationship between luminance and distance.

(Step S33) The processing device 11 calculates the attitude information of the palm using plane approximation. Calculation of attitude information is performed by recognizing the palm as a plane (plane approximation). The processing device 11 calculates, as attitude information, the inclination angles of the approximated plane in the horizontal and vertical directions on the basis of the distance value of each pixel.

(Step S34) The processing device 11 calculates the inclination angles of the approximated plane in the horizontal and vertical directions for each of the continuously acquired image information pieces.

(Step S35) The processing device 11 determines whether the calculated inclination angles are in an effective range. For example, the processing device 11 determines that the image information piece is valid if each of the inclination angles of the approximated plane in the horizontal and vertical directions is within a range of plus or minus 15 degrees, and determines that the image information piece is invalid if the inclination is excessively large.

If the processing device 11 determines that, in all the continuously acquired image information pieces, the inclination angles of the approximated plane in the horizontal and vertical directions are within the effective range, the attitude information acquisition process ends. On the other hand, if the processing device determines that the continuously acquired image information pieces include an image information piece in which the inclination angles of the approximated plane in the horizontal and vertical directions are out of the effective range, the process proceeds to step S36.

(Step S36) The processing device 11 outputs a guidance message for guiding the palm to an appropriate position. The guidance message is output by displaying guidance on the display 12. The guidance message may be an audio message output from a speaker (not illustrated). After the processing device 11 outputs the guidance message, the attitude information acquisition process ends.

In this way, the verification apparatus 10 may correct the inappropriate attitude of the palm to an appropriate attitude. Thus, the verification apparatus 10 may acquire, as an image information piece to be used for verification, an image information piece in which the palm is in an appropriate attitude.

It is to be noted that, although the processing device 11 is configured to output a guidance message if any of the continuously acquired image information pieces are out of the effective range, the processing device 11 may be configured not to output a guidance message if a predetermined number of consecutive image information pieces of the continuously acquired image information pieces are in the effective range. For example, the processing device 11 may be configured not to output a guidance message if eight consecutive image information pieces of the ten continuously acquired image information pieces are in the effective range.

Figure 9:
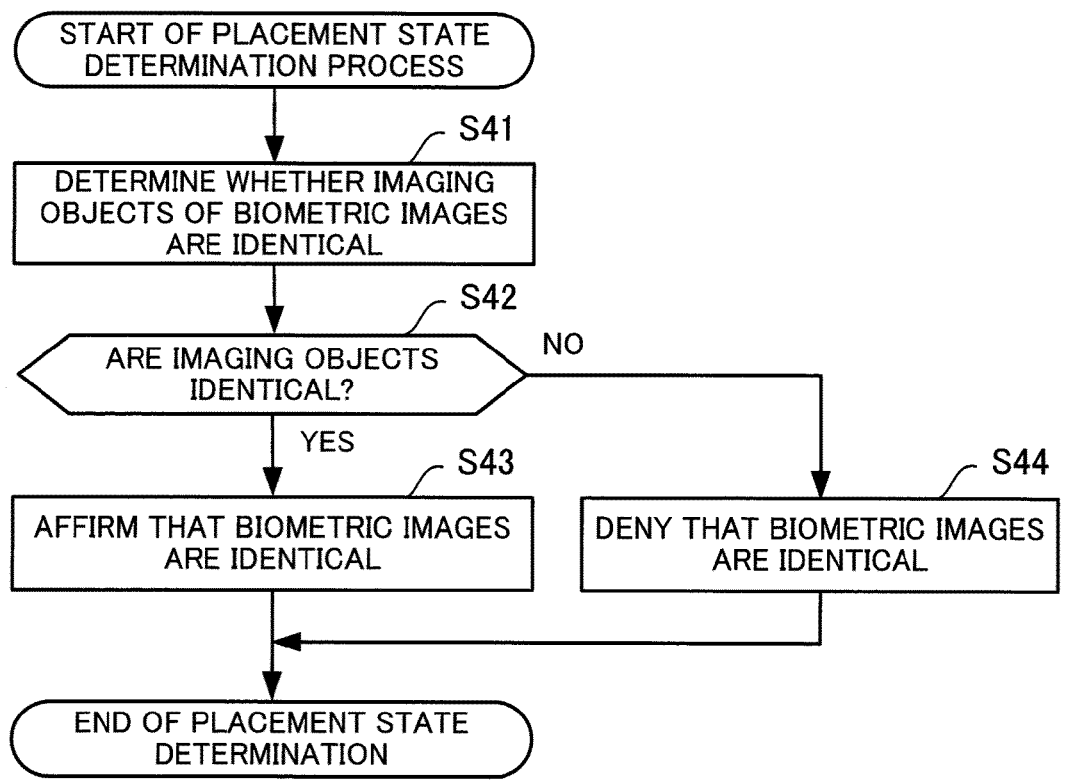
FIG. 9 is a flowchart of a placement state determination process according to the second embodiment.

Next, a placement state determination process performed by the processing device 11 will be described with reference to FIG. 9. FIG. 9 is a flowchart of a placement state determination process according to the second embodiment. The processing device 11 performs a placement state determination process for determining whether the plurality of image information pieces acquired from the sensor-unit-embedded mouse 14 are acquired from a continuous palm placing motion.

(Step S41) The processing device 11 determines whether imaging objects of a plurality image information pieces (biometric images) are identical to each other. In other words, the processing device 11 determines whether the hand of a same person is continuously placed over the sensor-unit-embedded mouse 14.

More specifically, the processing device 11 calculates the distance to the palm at the time each image information piece is captured, on the basis of the image information pieces and the distance information pieces acquired from the sensor-unit-embedded mouse 14. The processing device 11 determines whether there is no discontinuity in the time interval in which the image information pieces are captured, on the basis of the distances corresponding to the image information pieces. For example, in the case where the difference between the distances corresponding to two consecutive image information pieces is greater than a predetermined threshold, the processing device 11 determines that there is no continuity between the two consecutive images information pieces, that is, the two consecutive image information pieces are not generated from a continuous hand placing motion.

It is to be noted that determination of whether the imaging objects are identical may be performed on the basis of the shape of the hand, position (horizontal direction), orientation, angle, and the like.

(Step S42) If the processing device 11 determines that the imaging objects of the plurality of image information pieces are identical, the process proceeds to step S43. If the imaging objects are not identical, the process proceeds to step S44.

(Step S43) The processing device 11 affirms that the imaging objects of the plurality of image information pieces are identical. Thus, the placement state determination process ends.

(Step S44) The processing device 11 denies that the imaging objects of the plurality of image information pieces are identical. Thus, the placement state determination process ends.

In this way, the verification apparatus 10 prevents biometric information of another person generated intentionally or accidentally from being accepted. It is to be noted that the verification apparatus 10 may omit the placement state determination process if the imaging objects of a plurality of image information pieces have been ensured to be identical to each other based on the environment in which the images of the living body are captured. For example, the verification apparatus 10 may omit the placement state determination process if a sensor unit is provided that captures the image of a living body while holding the living body in a fixed state, or if the verification apparatus 10 is used in an environment in which a third party monitors the image capturing of the living body.

Figure 10:
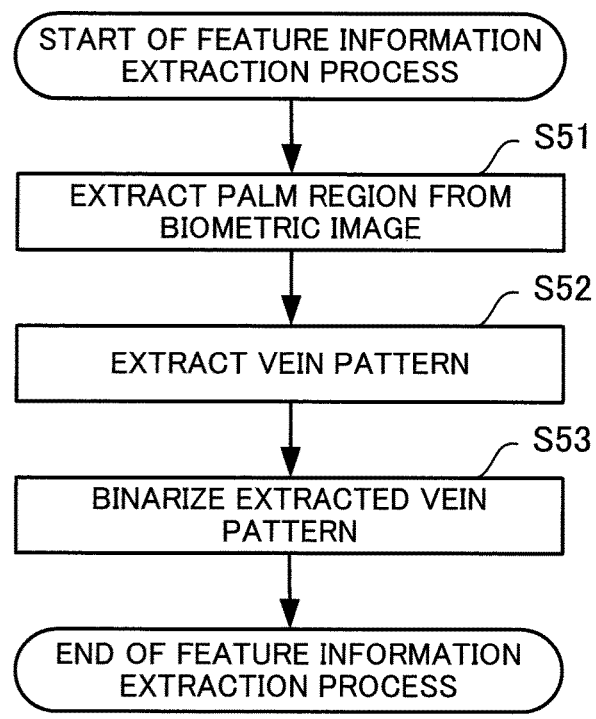
FIG. 10 is a flowchart of a feature information extraction process according to the second embodiment.
Figure 11:
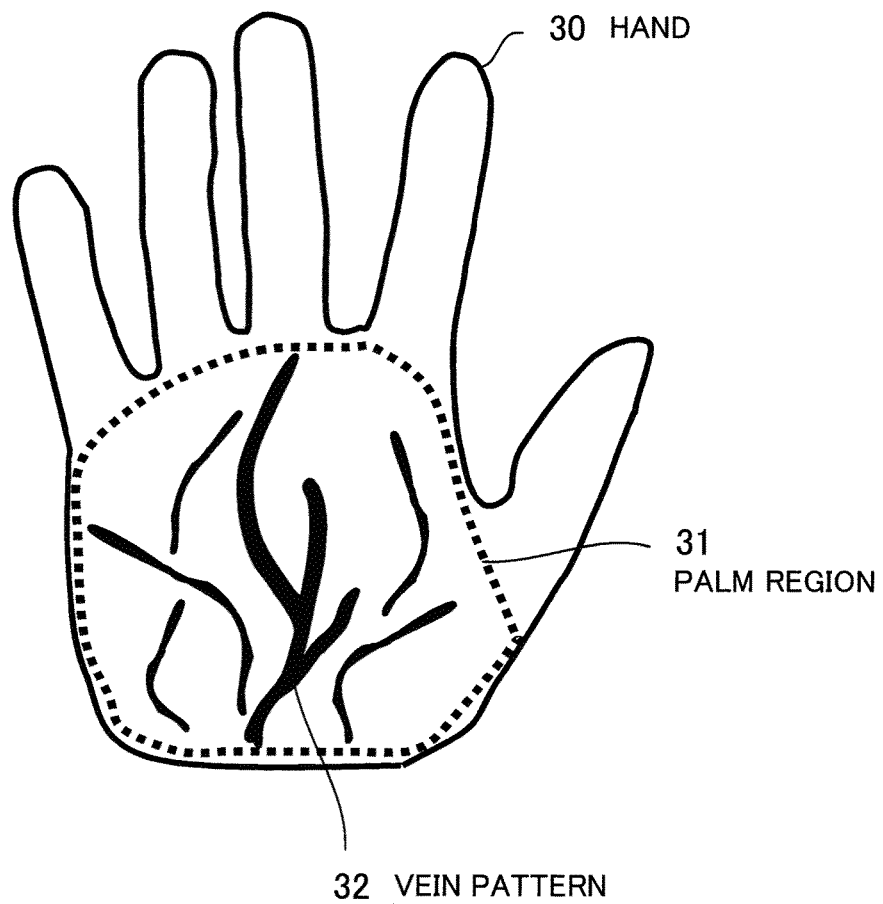
FIG. 11 illustrates feature information extraction performed by the verification apparatus according to the second embodiment.
Figure 12:
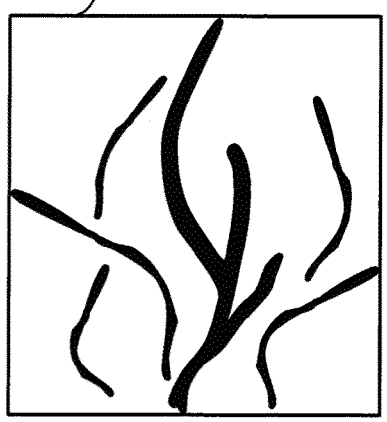
FIG. 12 illustrates an example of feature information extracted by the verification apparatus according to the second embodiment.

Next, a feature information extraction process performed by the processing device 11 will be described with reference to FIGS. 10 through 12. FIG. 10 is a flowchart of a feature information extraction process according to the second embodiment. FIG. 11 illustrates feature information extraction performed by the verification apparatus according to the second embodiment. FIG. 12 illustrates an example of feature information piece extracted by the verification apparatus according to the second embodiment. The processing device 11 performs a feature information extraction process for extracting a feature information piece from each of the acquired image information pieces.

(Step S51) The processing device 11 extracts a palm region 31 from a hand 30 (see FIG. 11) as the imaging object in each of the plurality of image information pieces (biometric information pieces). The processing device 11 may extract the palm region 31 in the same manner as in step S31 of the attitude information acquisition process.

(Step S52) The processing device 11 extracts a vein pattern 32 from the extracted palm region 31.

(Step S53) The processing device 11 binarizes the extracted vein pattern 32 so as to generate a binarized vein pattern image 35 (see FIG. 12). Thus, the feature information extraction process ends.

The thus obtained binarized vein pattern image is verified as feature information against the registered template. It is to be noted that binarization of the vein pattern 32 is normalization of feature information for facilitating comparison and verification with the registered template. A normalization operation may be an operation other than binarization, such as thinning or the like, or may be a combination of a plurality of operations such as binarization and thinning.

Figure 13:
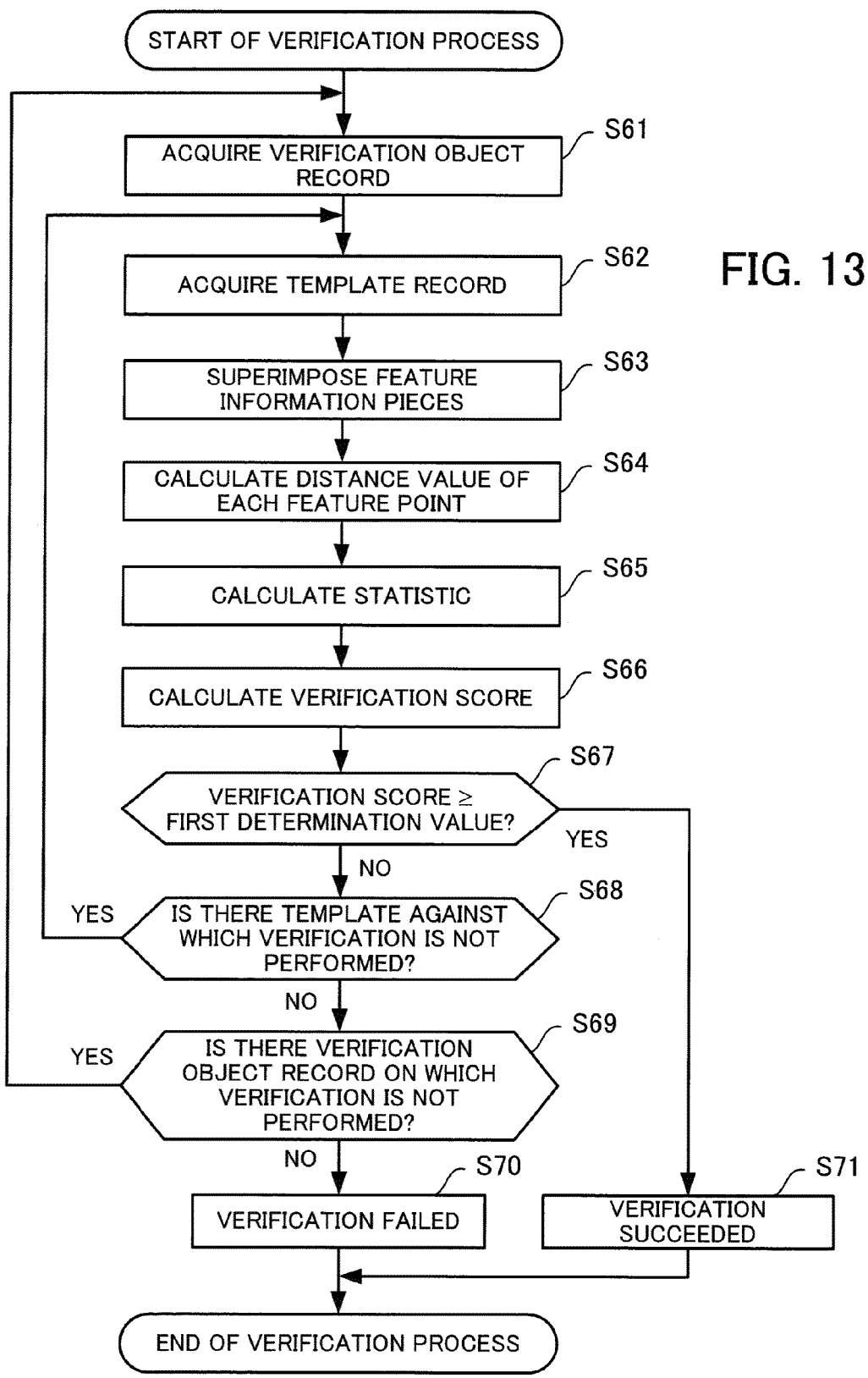
FIG. 13 is a flowchart of a verification process according to the second embodiment.
Figure 15:
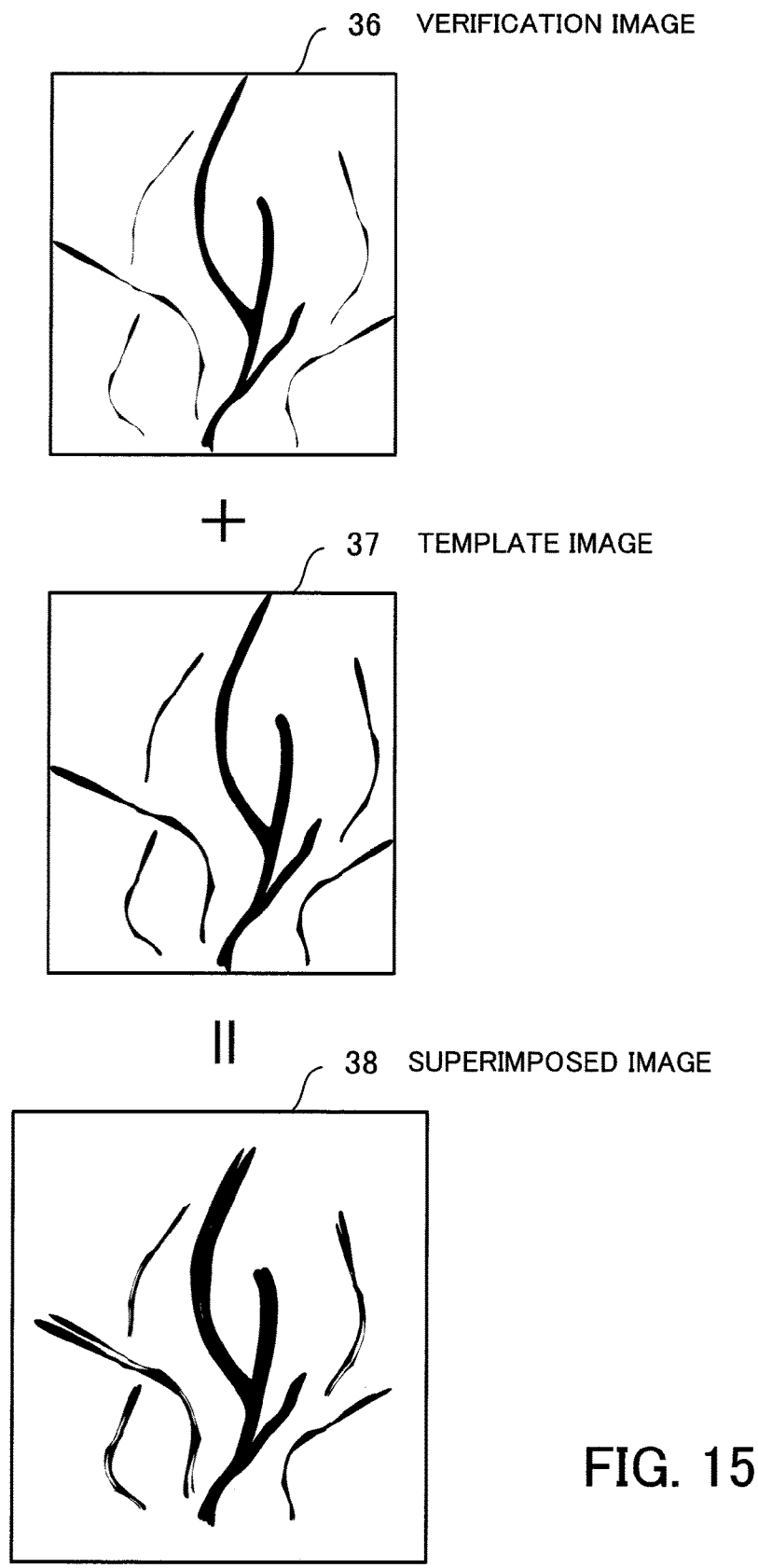
FIG. 15 illustrates verification performed by the verification apparatus according to the second embodiment.

Next, the authentication process performed by the processing device 11 will be described with reference to FIGS. 13 through 17. FIG. 13 is a flowchart of a verification process according to the second embodiment. FIG. 14 illustrates an example of registered template table according to the second embodiment. FIG. 15 illustrates verification performed by the verification apparatus according to the second embodiment. FIG. 16 illustrates verification performed by the verification apparatus according to the second embodiment. FIG. 17 illustrates exemplary verification results obtained by the verification apparatus according to the second embodiment. The processing device 11 performs a verification process for verifying an extracted feature information piece against a registered template.

(Step S61) The processing device 11 acquires, as a verification object record, a feature information piece of one of the plurality of image information pieces which is generated in the feature information extraction process.

(Step S62) The processing device 11 acquires a feature information piece of a registered template, as a template record. More specifically, one or more template records are registered for each user in a registered template table 310 (see FIG. 14). For example, for the user ID "0001", "FEATURE 0001-1", "FEATURE 0001-2", . . . , and "FEATURE 0001-M" are registered as template records (feature information pieces). In the case where there are a plurality of feature information pieces that are registered as templates, the processing device 11 acquires one of the feature information pieces.

(Step S63) The processing device 11 superimposes one feature information piece subject to verification and one feature information piece registered as a template. More specifically, as illustrated in FIG. 15, the feature information piece subject to verification and the feature information piece registered as a template are superimposed in a manner such that a verification image 36 and a template image 37 are superimposed so as to obtain a superimposed image 38.

(Step S64) The processing device 11 calculates a distance value of each feature point in the feature information piece subject to verification and the feature information piece registered as a template. More specifically, as illustrated in FIG. 16, the processing device 11 traces a vein image (verification image) 40, and calculates a distance value of each feature point to a proximal point of a vein image (template image) 42. A distance value $L_i$ between a feature point (verification image) 41 and a feature point (template image) 43 is represented by the following expression (3):

$$L_i = \sqrt{(\Delta x^2 + \Delta y^2)} \qquad (3)$$

where $\Delta x$ is the difference in x-component, and $\Delta y$ is the difference in y-component.

In this way, the processing device 11 calculates the distance values of all the feature points in the verification image 36.

(Step S65) The processing device 11 calculates a statistic for the calculated distance values. More specifically, in the case where there are n feature points, the processing device 11 calculates a sum Ls using an expression (4), calculates a mean value Lm using an expression (5), and calculates a variance $V^2$ using an expression (6). It is to be noted that calculation of a variance $V^2$ may be performed only when an expression (7) is satisfied. In this way, the processing device 11 may calculate a variance only for feature points having a large variance, that is, points where the displacement between the vein patterns is equal to a predetermined value c or greater. Thus, the processing device 11 may exclude the verification results obtained from poor extraction results due to noise, the attitude of the placed hand, or the like, from evaluation.

$$Ls = \sum_{i=0}^{n} L_i \qquad (4)$$

$$Lm = \frac{L}{n} \qquad (5)$$

$$V^2 = \frac{1}{n}\sum_{i=0}^{n}(L_i - Lm)^2 \qquad (6)$$

$$(L_i - Lm)^2 \geq \varepsilon \qquad (7)$$

(Step S66) The processing device 11 calculates a verification score on the basis of the calculated statistic. The verification score is an index for evaluating the similarity of a feature information piece subject to verification to a feature information piece registered as a template, and is represented by a value in the range from 0 to 1,200. The greater the verification score is, the higher the similarity of the feature information piece subject to verification to the feature information piece is. FIG. 17 illustrates an example of verification scores calculated in the manner described above. For example, the verification result number "0001" has a verification score "478".

(Step S67) The processing device 11 compares the calculated verification score with a first determination value. If the processing device 11 determines that the calculated verification score is equal to or greater than the first determination value, the process proceeds to step S71. If the calculated verification score is less than the first determination value, the process proceeds to step S68.

The first determination value is a threshold that is set on the basis of a target authentication accuracy of the verification apparatus 10, that is, a false rejection rate (FRR) and a false acceptance rate (FAR) that are acceptable. For example, the first determination value is set to "500".

(Step S68) The processing device 11 determines whether there is a template record against which verification of the feature information piece acquired in step S61 is not yet performed. If the processing device 11 determines that there is a template record against which verification is not yet performed, the process proceeds to step S62. If there is no template record against which verification is not yet performed, the process proceeds to step S69.

For example, in the case of the user ID "0001", the processing device 11 determines whether verification is performed against all the template records: "FEATURE 0001-1", "FEATURE 0001-2", . . . , and "FEATURE 0001-M". In this way, if there are m template records, the processing device 11 performs verification m times for one feature information piece subject to verification, and obtains m verification results.

(Step S69) The processing device 11 determines whether, among the plurality of image information pieces, there is a feature information piece that is not acquired as a verification object record. If the processing device 11 determines that there is a verification object record on which verification is not yet performed, the process proceeds to step S61. If there is no verification object record on which verification is not yet performed, the process proceeds to step S70.

(Step S70) The processing device 11 determines that the verification using the first determination value has failed (verification: FAILURE). Thus, the verification process ends.

(Step S71) The processing device 11 determines that the verification using the first determination value has succeeded (verification: SUCCESS). Thus, the verification process ends.

In this way, in the case where the verification using the first determination value has failed, the processing device 11 obtains verification results of a plurality of combinations of verification object record and template record. For example, in the case where n image information pieces are continuously acquired from the user ID "0001", verification is performed m times for each of feature information pieces generated from the respective image information pieces, so that a maximum of m×n verification results are obtained.

As illustrated in verification results 300, the processing device 11 attaches a verification result number to each of the thus obtained verification results. Then, the processing device 11 stores a verification score and a distance variance for each verification result number. The verification results 300 illustrate an example in which there are three template records and three image information pieces. In the verification results 300, since there are three template records and three image information pieces, there are 9 (=3×3) verification results.

It is to be noted that, although the processing device 11 performs verification using m templates records, verification may be performed using a single template. Alternatively, in the case where there are m template records, the processing device 11 may perform verification using j (j≤m) template records.

Figure 18:
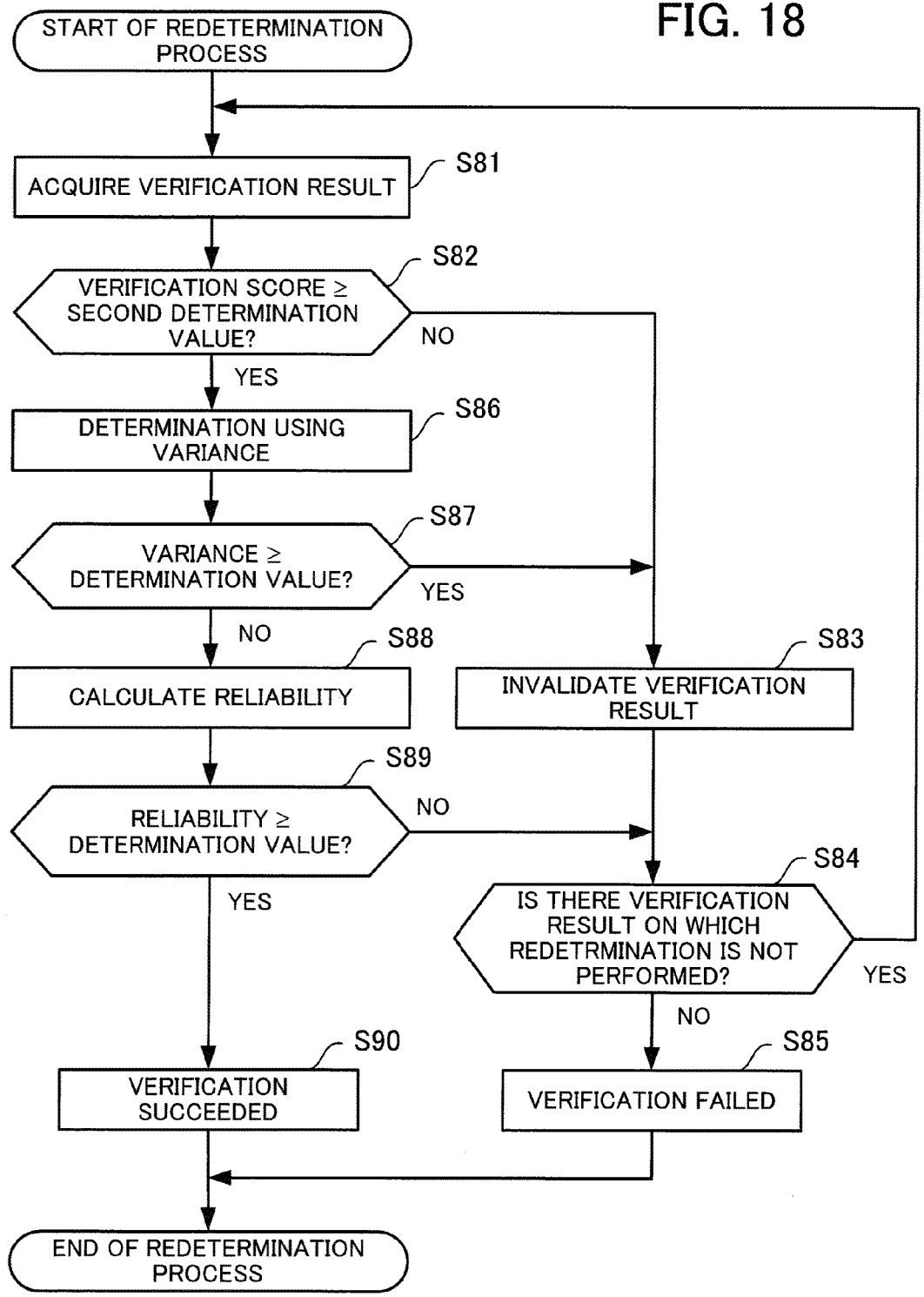
FIG. 18 is a flowchart of a redetermination process according to the second embodiment.

Next, a redetermination process performed by the processing device 11 will be described with reference to FIG. 18. FIG. 18 is a flowchart of a redetermination process according to the second embodiment. The processing device 11 performs a redetermination process for performing redetermination for image information pieces that are rejected in the verification process.

(Step S81) The processing device 11 acquires, as a redetermination object record, one of verification results that are rejected in the verification process.

(Step S82) The processing device 11 compares the verification score of the verification result subject to redetermination with a second determination value. If the processing device 11 determines that the verification score of the verification result subject to redetermination is equal to or greater than the second determination value, the process proceeds to step S86. If the verification score of the verification result subject to redetermination is less than the second determination value, the process proceeds to step S83.

The second determination value is a threshold that is set on the basis of an authentication accuracy that is not acceptable by the verification apparatus 10, that is, false rejection rate (FRR) and false acceptance rate (FAR) that are unacceptable. For example, the second determination value is set to "350". The second determination value is based on a less stringent criterion than that of the first determination value. In this embodiment, the first determination value is greater than the second determination value.

(Step S83) The processing device 11 invalidates the verification result subject to redetermination. Invalidation of such a verification result subject to redetermination makes it possible to remove instable verification results and thereby to improve the accuracy of redetermination.

(Step S84) The processing device 11 determines whether, among the verification results that are rejected in the verification process, there is a verification result on which redetermination is not performed. If the processing device 11 determines that there is a verification result on which redetermination is not performed, the process proceeds to step S81. If there is no verification result on which redetermination is not performed, the process proceeds to step S85.

(Step S85) The processing device 11 determines that the redetermination has failed (verification: FAILURE). Thus, the redetermination process ends.

(Step S86) The processing device 11 compares the distance variance of the verification result subject to redetermination with a third determination value. The third determination value (variance determination threshold) is a preset value, and is a statistically calculated distance variance value that is associated with a predetermined risk of false acceptance. In this embodiment, the third determination value is set to "4,800".

The processing device 11 stores a comparison result between the distance variance of the verification result subject to redetermination and the third determination value, in the verification results 300 as a variance determination result. The processing device 11 stores "YES" in the verification results 300 if the distance variance of the verification result subject to redetermination is equal to or greater than the third determination value, and stores "NO" in the verification results 300 if the distance variance of the verification result subject to redetermination is less than the third determination value.

(Step S87) If the processing device 11 determines that the distance variance of the verification result subject to redetermination is equal to or greater than the third determination value, the process proceeds to step S83, in which the processing device 11 invalidates the verification result whose distance variance is equal to or greater than the third determination value. On the other hand, if the distance variance of the verification result subject to redetermination is less than the third determination value, the process proceeds to step S88.

In this way, in the case where the distance variance of a verification result subject to redetermination is equal to or greater than the third determination value, the verification apparatus 10 invalidates the verification result, and thus prevents false acceptance of a user having similar features.

(Step S88) The processing device 11 calculates the reliability of the verification result subject to redetermination, using an expression (8).

$$S_i=(M_i-TH2)/(TH1-TH2) \quad (8)$$

where $S_i$ is the reliability of the i-th verification result; $M_i$ is the verification score of the i-th result; TH1 is the first determination value; and TH2 is the second determination value.

Further, the processing device 11 calculates the cumulative reliability of the verification results that have been subject to redetermination, using an expression (9). For example, according to the verification results 300, the reliability $S_i$ of the verification result number "0001" is "85.333%", and the cumulative reliability S is "85.333% (=1−(1−0.853))". Further, the reliability $S_3$ of the verification result number "0003" is "26.000%", and the cumulative reliability S is "89.147% (=1−(1−0.85333)(1−0.26000))". In this way, if there are i verification results that have been subject to redetermination, the cumulative reliability is calculated on the basis of i reliabilities.

$$S=1-(1-S_1)(1-S_2)\ldots(1-S_{n-1})\times(1-S_n) \quad (9)$$

(Step S89) If the processing device 11 determines that the cumulative reliability of the verification results that have been subject to redetermination is equal to or greater than a fourth determination value, the process proceeds to step S90. If the cumulative reliability of the verification results that have been subject to redetermination is less than the fourth determination value, the process proceeds to step S84.

The fourth determination value (reliability determination threshold) is a preset value. In this embodiment, the fourth determination value is set to "99.000%".

(Step S90) The processing device 11 determines that the verification using the fourth determination value has succeeded (verification: SUCCESS). Thus, the redetermination process ends. According to the fourth determination value "99.000%" in the verification results 300, when redetermination is performed on the verification result number "0006", the obtained cumulative reliability is "99.973%", and hence the processing device 11 determines that the verification has succeeded.

In this way, in the case where the imaging objects of the plurality of image information pieces are ensured to be identical, the verification apparatus 10 performs redetermination on a set of reliabilities calculated from the verification scores of the verification results so as to improve the accuracy of user authentication.

It is to be noted that although the processing device 11 acquires redetermination object records in verification result number order, the processing device 11 may acquire redetermination object records after sorting the records by verification score or distance variance.

It is to be noted that the verification apparatus 10 may be implemented as an automated teller machine (ATM) installed in a financial institution, and a verification apparatus of a room access control system installed at the entrance of a room.

The above-described processing functions may be implemented on a computer. In this case, a program describing the functions of each device is provided. The computer executes the program, so that the above-described processing functions are implemented on the computer. The program may be stored in a computer-readable recording medium (including a portable recording medium). Examples of computer-readable recording media include magnetic storage devices, optical discs, magneto-optical storage media, semiconductor memories, and the like. Examples of magnetic storage devices include hard disk drives (HDDs), flexible disks (FDs), magnetic tapes, and the like. Examples of optical discs include digital versatile discs (DVDs), DVD-RAMs, CD-ROMs, compact disc-recordable/rewritables (CD-R/RWs), and the like. Examples of magneto-optical storage media include magneto-optical disks (MOs) and the like.

Portable storage media, such as DVD and CD-ROM, are used for distribution of the program. Further, the program may be stored in a storage device of a server computer so as to be transmitted from the server computer to other computers via a network.

A computer which is to execute the program stores, in its storage device, the program recorded on a portable storage medium or the program transmitted from a server computer. Then, the computer reads the program from its storage device and performs processing in accordance with the program. The computer may read the program directly from the portable recording medium, and execute processing in accordance with the program. Alternatively, the computer may sequentially receive the program from the server computer and execute processing in accordance with the received program.

It is to be noted that although the palm is illustrated as the body surface in the above embodiments, the body surface is not limited thereto and may be the surface of any part of the body. For example, the body surface may be of the sole of the foot, finger, toe, the back of the hand, the instep of the foot, wrist, arm, and the like.

In the case where the information on veins is used for biometric authentication, the body surface may be the surface of any part where veins are observable. It is advantageous to acquire biometric information from the surface of a body part whose location is identifiable. For example, in the case where biometric information is acquired from the palm or the face, it is possible to identify the location from which the biometric information is acquired, on the basis of the acquired image.

Further, the biometric information to be used for authentication is not limited to information on veins, and may include other types of information such as information on fingerprints, handprints, and the like.

The above-described verification apparatus, verification program, and verification method are capable of reducing the difficulty in authenticating a user under specific conditions so as to increase the authentication rate and thus to improve the usability.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A verification apparatus comprising:
   a memory configured to store a plurality of biometric information pieces acquired from a same biometric information source part; and
   one or more processors configured to perform a procedure including:
   performing first verification on one of the plurality of biometric information pieces, using a preregistered verification information piece and a first determination value, and
   performing second verification on the plurality of biometric information pieces having a predetermined relationship, using the verification information piece and a second determination value which defines a less stringent criterion than the first determination value, when the first verification fails.

2. The verification apparatus according to claim 1, wherein the performing second verification includes determining that the verification has succeeded when there are a plurality of biometric information pieces that do not satisfy the first determination value but satisfy the second determination value.

3. The verification apparatus according to claim 2, wherein:
   the procedure further includes determining whether the plurality of biometric information pieces are acquired from a same person; and
   the performing second verification includes performing verification on the plurality of biometric information pieces that are determined to be acquired from a same person.

4. The verification apparatus according to claim 1, wherein the plurality of biometric information pieces are acquired from a same person.

5. A non-transitory computer-readable storage medium storing a verification program, the verification program causing a computer to perform a procedure comprising:
   performing first verification on one of a plurality of biometric information pieces acquired from a same biometric information source part, using a preregistered verification information piece and a first determination value; and
   performing second verification on the plurality of biometric information pieces having a predetermined relationship, using the verification information piece and a second determination value which defines a less stringent criterion than the first determination value, when the first verification fails.

6. A verification method comprising:
   performing, by a processor, first verification on one of a plurality of biometric information pieces acquired from a same biometric information source part, using a preregistered verification information piece and a first determination value; and
   performing, by the processor, second verification on the plurality of biometric information pieces having a predetermined relationship, using the verification information piece and a second determination value which defines a less stringent criterion than the first determination value, when the first verification fails.

* * * * *